No. 607,491. Patented July 19, 1898.
M. SWENSON.
AUTOMATIC RELIEF VALVE.
(Application filed Feb. 18, 1898.)
(No Model.)
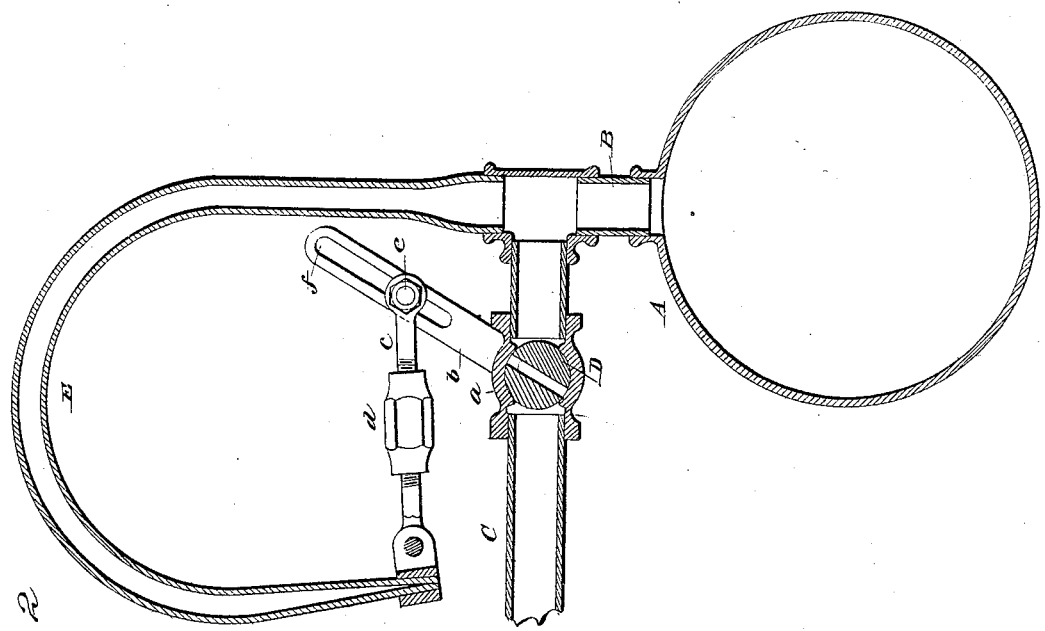
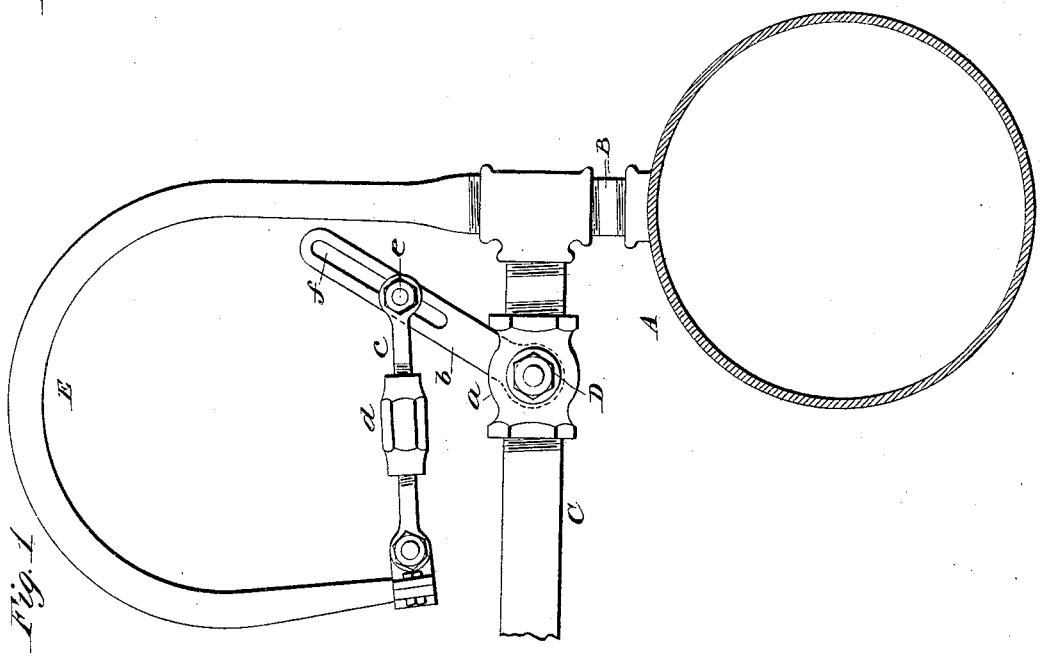
Witnesses:
Inventor
Magnus Swenson
by Frank L. Dyer
Att'y.

UNITED STATES PATENT OFFICE.

MAGNUS SWENSON, OF CHICAGO, ILLINOIS, ASSIGNOR TO THE AMERICAN COTTON COMPANY, OF NEW JERSEY.

AUTOMATIC RELIEF-VALVE.

SPECIFICATION forming part of Letters Patent No. 607,491, dated July 19, 1898.

Application filed February 18, 1898. Serial No. 670,806. (No model.)

*To all whom it may concern:*

Be it known that I, MAGNUS SWENSON, a citizen of the United States, residing at Chicago, in the county of Cook and State of Illinois, have invented certain new and useful Improvements in Automatic Relief-Valves, of which the following is a specification.

My invention relates to improvements in automatic relief-valves; and the objects of the invention are to simplify the construction and improve the efficiency of such valves. In the common form of valves of this type an ordinary puppet-valve is employed, spring-pressed against a flat or inclined seat. In using valves of this type for maintaining a relatively-uniform pressure on water which contains dirt and foreign substances I find that there is danger of the valve refusing to accurately seat itself, so that it fails to maintain the pressure desired.

By my improved automatic relief-valve a relatively-uniform pressure may be maintained not only on liquids containing impurities and foreign substances, but also upon gases and vapors under pressure.

In carrying out my invention I provide a valve, preferably a rotary or plug valve, which holds the pressure up to the point desired, and combine with said valve a closed, bent, or arched tube which is subjected to the pressure to be relieved and which by reason of that pressure tends to change its form and to thereby open the valve. These parts will be so arranged that only when the pressure has reached the desired point will the form of the tube be changed to an extent sufficient to result in the opening of the valve, whereupon the pressure will be allowed to drop, and the valve will then close, as will be explained. To increase the capacity of the device, provision will preferably be made by which the pressure to be maintained can be effectively and accurately regulated, so that the device can be employed for maintaining any desired pressure on the liquid, vapor, or gas.

In order that my invention may be better understood, attention is directed to the accompanying drawings, forming a part of this specification, in which—

Figure 1 is a side elevation of the preferred embodiment of my improved automatic relief-valve, and Fig. 2 a vertical section thereof.

In both the above views corresponding parts are represented by the same letters of reference.

A represents a chamber containing the liquid, vapor, or gas under pressure, to which chamber the liquid, vapor, or gas will be constantly supplied. The chamber A may be a closed receptacle, except for its entrance-pipe, or it may be a pipe in a water system, gas-line, &c. Communicating with the chamber A is a pipe B, in which or in a branch pipe C is the valve D. The valve D is preferably a rotary or plug valve fitting accurately in a bore formed in a valve-casing $a$ and with the opening in said valve controlling the passage of the liquid, fluid, or gas through the pipe C. The valve-plug D is provided with a rectangular outer end, on which is mounted a lever $b$ for rotating the valve to open or close the passage through the pipe C.

E is a closed tube, made preferably of thin steel, the said tube being of some form which when subjected to pressure from within will result in the tube changing its shape. The tube may be formed conveniently of the arched shape shown. This tube is screw-threaded at its open end into the upper part of a coupling which connects the pipes B and C, so that the interior of the tube will be in communication with the chamber A, and the tube will therefore be subjected to the pressure of the water, gas, or liquid in said receptacle. Connecting the closed end of the tube E with the lever $b$ is a link $c$, which is preferably provided with a turnbuckle $d$ at its central portion, so that the length of said link may be adjusted as desired. The bolt $e$, by which the end of the link $c$ is connected to the lever $b$, preferably works in a slot $f$, so that the device will be capable of adjustment to different pressures, as will be explained.

The operation of the invention is as follows: The normal position of the tube E maintains the valve D closed. As the pressure increases in the receptacle A that pressure tends to straighten out the tube E, or, in other words, to elongate the base of the arch. This movement tends to partially rotate the valve D, but until the pressure has reached a sufficiently high point this movement is not enough to open the said valve. When, however, the pressure has reached the desired point, there will be sufficient movement of the tube to open the valve D, which will allow of the escape of the liquid, gas, or vapor through said valve, and the pressure in the receptacle A will be immediately reduced. This reduction in the pressure allows the tube to approach toward its normal position to close the valve. In this way an approximately uniform pressure will be maintained in the receptacle A, the valve opening as soon as the pressure reaches the desired point and closing the instant the pressure drops below that point. By making the link $c$ adjustable its length can be regulated so that either an extended or a relatively small movement of the tube E may result in the opening of the valve and in the relief of the pressure. It will be obvious that when an extended movement of the tube E is required to open the valve the pressure will be maintained at a very much higher point than when only a very small movement is required to effect that end. Instead of obtaining the desired regulation of pressure by lengthening or shortening the link $c$, the same result will be obtained by securing the connecting-bolt $e$ at a desired point in the slot $f$, it being noted that when the said bolt is at the top of the slot a much smaller movement of the tube E will be required to open the valve than when the bolt is at the bottom of said slot.

Having now described my invention, what I claim as new, and desire to secure by Letters Patent, is as follows:

1. In an automatic relief-valve, the combination of a valve for holding the pressure, and a closed tube connected with said valve and subjected internally to the pressure to be relieved, said tube being of a form adapted to be changed by pressure, substantially as set forth.

2. In an automatic relief-valve, the combination of a rotary valve for holding the pressure, and a closed tube connected with said valve and subjected internally to the pressure to be relieved, said tube being of a form adapted to be changed by pressure, substantially as set forth.

3. In an automatic relief-valve, the combination of a valve for holding the pressure, a closed tube subjected to the pressure to be relieved, said tube being of a form adapted to be changed by pressure, and adjustable connections between said tube and said valve, substantially as set forth.

4. In an automatic relief-valve, the combination of a rotary valve for holding the pressure, a closed tube subjected to the pressure to be relieved, said tube being of a form adapted to be changed by pressure, and adjustable connections between said tube and said valve, substantially as set forth.

5. In an automatic relief-valve, the combination of a valve for holding the pressure, a curved tube subjected to the pressure to be relieved, a slotted lever connected to said valve, and a link connecting said slotted lever with the closed end of said tube, said link being adjustable in said slotted lever, substantially as set forth.

6. In an automatic relief-valve, the combination of a valve for holding the pressure, a curved tube subjected to the pressure to be relieved, a slotted lever connected to said valve, and an adjustable link connecting said slotted lever with the closed end of said tube, said link being adjustable in said slotted lever, substantially as set forth.

This specification signed and witnessed this 15th day of February, 1898.

MAGNUS SWENSON.

Witnesses:
B. A. JOHNSTON,
JAS. H. GIBSON.